Figure 1:
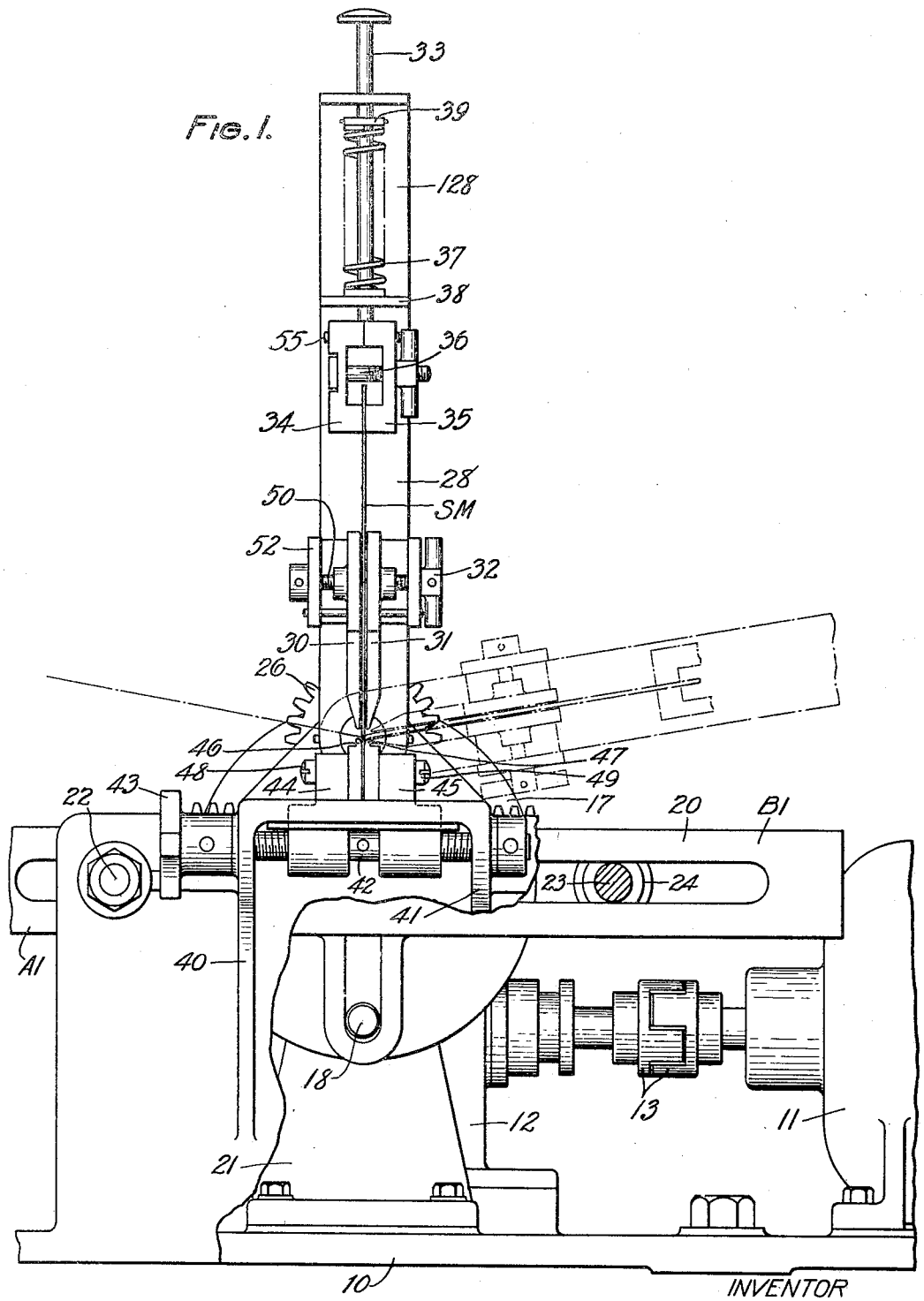

March 20, 1934.  W. S. HAYFORD  1,951,908
RESISTANCE TESTING MACHINE
Filed Sept. 11, 1929   2 Sheets-Sheet 1

INVENTOR
W. S. HAYFORD
BY J. MacDonald
ATTORNEY

March 20, 1934.  W. S. HAYFORD  1,951,908
RESISTANCE TESTING MACHINE
Filed Sept. 11, 1929   2 Sheets-Sheet 2
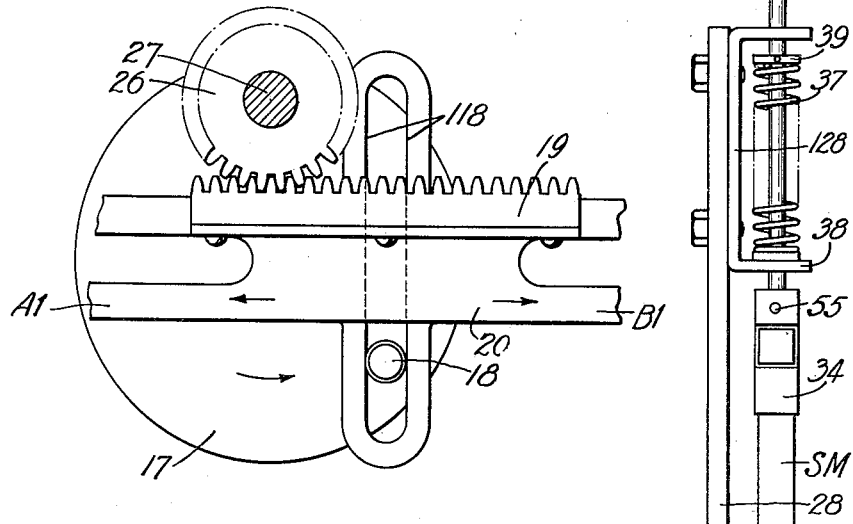
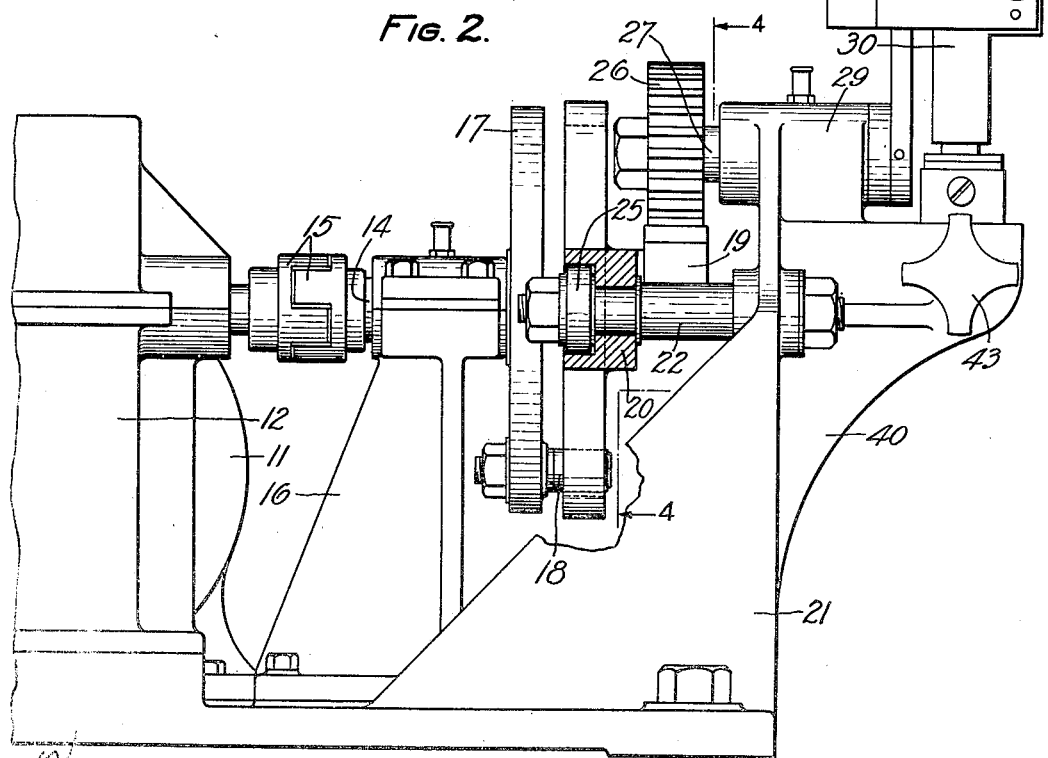
INVENTOR
W. S. HAYFORD
BY J. MacDonald
ATTORNEY Patented Mar. 20, 1934

1,951,908

UNITED STATES PATENT OFFICE 1,951,908

RESISTANCE TESTING MACHINE

Walter S. Hayford, Morristown, N. J., assignor to Bell Telephone Laboratories, Incorporated, New York, N. Y., a corporation of New York Application September 11, 1929, Serial No. 391,757

3 Claims. (Cl. 73—51)

This invention relates to testing machines of the type used for testing the resistance of sheet metals or wire to repeated bending.

The object of this invention is to provide a machine of this character which will be simple, cheap to manufacture and which will effect such testing operations in a minimum of time.

In the machine of this invention a sample of material, for example in the form of a strip, is clamped at one end between a pair of stationary jaw members and at its other end between a pair of jaw members mounted on a lever adapted to be oscillated within a certain angular distance and at a given speed through the operation of a gear reduction mechanism and a plurality of translating mechanisms actuated by a motor. The sample of material is held lengthwise under slight tension by a spring acting on the lever jaw and a guide carried by the oscillating lever is provided for causing the sheet to bend within the configuration of the stationary jaw members. Equalizing means for each pair of jaws is provided for fastening and readily locating a sample of material in adjusted position with respect to the pivotal center of the lever.

In the drawings Fig. 1 is a front elevation of the machine, Fig. 2 is a side view thereof and Fig. 3 is a partial view of the translating mechanisms used in this machine.

The testing machine of this invention consists of a base plate 10 on which is mounted a motor 11 for actuating an ordinary gear reduction mechanism mounted in a case 12 through a universal coupling 13 shown in Fig. 1. The driving end of the gear reduction mechanism is operably connected to a spindle 14 by a universal coupling 15. Spindle 14 is journalled in an upright support 16 mounted on the plate 10 and at the other end of this spindle is mounted a disc 17 which carries a pin 18 provided for reciprocally actuating a gear rack 19 through the movement of a cross shaped member 20 as will be hereinafter described in detail.

Integrally formed with the mounting plate 10 is an upright support 21 on which a pair of studs 22 and 23 are mounted. These studs support the member 20 and are provided at their free end with rollers 24 and 25 engaging the race tracks in the arms B1 and A1 of this member. The pin 18 engages a slot 118 in the vertical or cross arms of member 20 for reciprocally actuating the member 20 and thereby translating the rotation of disc 17.

On member 20 and in line parallel thereto is mounted the gear rack 19 shown in Figs. 2 and 3. This gear rack meshes with a pinion 26 which is keyed on one end of a spindle 27 journalled in the bushing 29 of upright support 21 and on the other end of spindle 27 there is keyed a lever member 28, the angular movement of pinion 26 under control of the rack 19 being effective to translate the rectilinear movement of the rack 19 into a rotary movement for imparting oscillatable movements to lever 28, an angular distance of substantially 80° from each side of the vertical position as shown in Fig. 1.

On the lower end of lever 28 is mounted an adjustable bracket 52 which supports a pair of guiding plates 30 and 31 mounted on a differential screw 50 which is actuated by a winged nut 32. This screw is provided for changing the space between the plates 30 and 31 for accommodating strips of material of different thickness while retaining the centered position of the strips with respect to the pivotal center of the lever member 28, bracket 52 being made adjustable along the lever 28 for a purpose that will be hereinafter described in detail.

On the free end of lever 28 there is mounted a bracket 128 in which is slidably mounted a manually operable rod 33 which carries at its lower end a clamping device in the form of jaw members 34 and 35 between which the sample to be tested may be secured by bolt 36. These jaw members are slidably mounted on a pin 55 disposed across the rod 33 as shown in Fig. 2. A spring 37 is mounted between the arm 38 of the bracket 128 and a collar 39 which is secured on rod 33 for holding the sample of material under slight tension during the operation of the machine.

Laterally extending from upright support 21 there is provided a pair of brackets 40 and 41 in which a differential screw 42 is journalled. This screw is provided with an actuating knob 43 for opening and closing the blocks 44 and 45 and the jaw members 46 and 47 carried by these blocks for securing the end of the sample to be tested, the differential action of the screw 50 being effective to maintain the sample in centered position with respect to the pivotal center of lever 28.

In a testing operation the sample of material SM to be tested as shown in Figs. 1 and 2 is secured at one end between jaw members 46 and 47. The other end of the sample is secured between the jaws 34 and 35 in a manner that the spring 37 exerts a light tension on the sample. The jaws 30 and 31 are then adjusted in a manner as to permit free relative movement between the sample and the jaws during the oscillating movement of lever 28 and the distance between the lower ends of jaw members 30 and 31 is adjusted with respect to the portion of jaw members 46 and 47 on which the sample is caused to bend according to the configuration of these jaws, upon the oscillating movement of lever 28, that is, 160° from the position indicated by the dotted lines in Fig. 1. Best results are obtained by adjusting the bracket 52 in a manner that the lower ends of plates 30 and 31 just clear the effective surface of jaw members 46 and 47 in their movement with lever 28. Similarly best results are obtained when the radii of the effective portion of jaw members 46 and 47 is made approximately four times the thickness of the material under test. In such bending tests it has been found that the number of bends required for fracturing the sample of material was in exact relation to its tensile strength.

What is claimed is:

1. A testing machine for determining the resistance of material to stress comprising a motor, a gear reduction mechanism operatively connected to said motor, a crank operatively connected to said mechanism, a base, a rectilinearly movable member mounted on said base and disposed in engaged relation with said crank, a gear rack carried by said member, a spindle journaled in said base, a gear mounted on one end of said spindle and engaging said rack, a lever mounted on the other end of said spindle, a rod slidably mounted on said lever and in line parallel thereto, a pair of jaw members at the end of said rod for securing one end of the sample under test, another pair of jaw members mounted on said base for securing the other end of the sample and having effective edges rounded, and means adjustably mounted on said lever and engaging the sample to force it to bend according to the geometric shape of the last mentioned jaw members upon the operation of said motor.

2. A testing machine for determining the resistance of material to stress comprising a motor, a lever member, a translating mechanism operatively connecting said lever to said motor for imparting bending movements to the sample of material under test, a rod carried by said lever, a base, a pair of stationary jaw members mounted on said base for clamping the sample at one end, a pair of jaw members carried by said rod for clamping the sample at the other end, said stationary jaw members having their effective edges rounded, a pair of plates carried by said lever loosely engaging the sample and a spring acting on said rod for holding the sample under tension during its bending movements, the plates forcing the material to bend according to the curvature at the edges of said stationary jaw members.

3. A testing machine for determining the resistance of material to stress comprising a motor, a lever, a translating mechanism actuated by said motor for imparting oscillatable movements to said lever, means carried by said lever for holding one end of the sample under test, a base, a pair of rounded jaw members mounted on said base for holding the sample at the other end, a pair of plates carried by said lever and adjustable relative to each other for loosely receiving material of different thickness and toward said stationary jaw members so as to force the material to bend within a radius substantially four times its thickness on said jaw members, the angular movement of said lever being substantially 160 degrees.

WALTER S. HAYFORD.